Dec. 14, 1948.  G. R. ELLIOTT  2,455,984
HYDRAULIC PRESSURE INTENSIFIER UNIT
Filed Jan. 22, 1945   3 Sheets-Sheet 1

INVENTOR.
GORDON R. ELLIOTT.
BY Robert A. Sloman
ATTORNEY.

Dec. 14, 1948.   G. R. ELLIOTT   2,455,984
HYDRAULIC PRESSURE INTENSIFIER UNIT

Filed Jan. 22, 1945   3 Sheets-Sheet 2

INVENTOR.
GORDON R. ELLIOTT
BY
Robert A. Sloman
ATTORNEY.

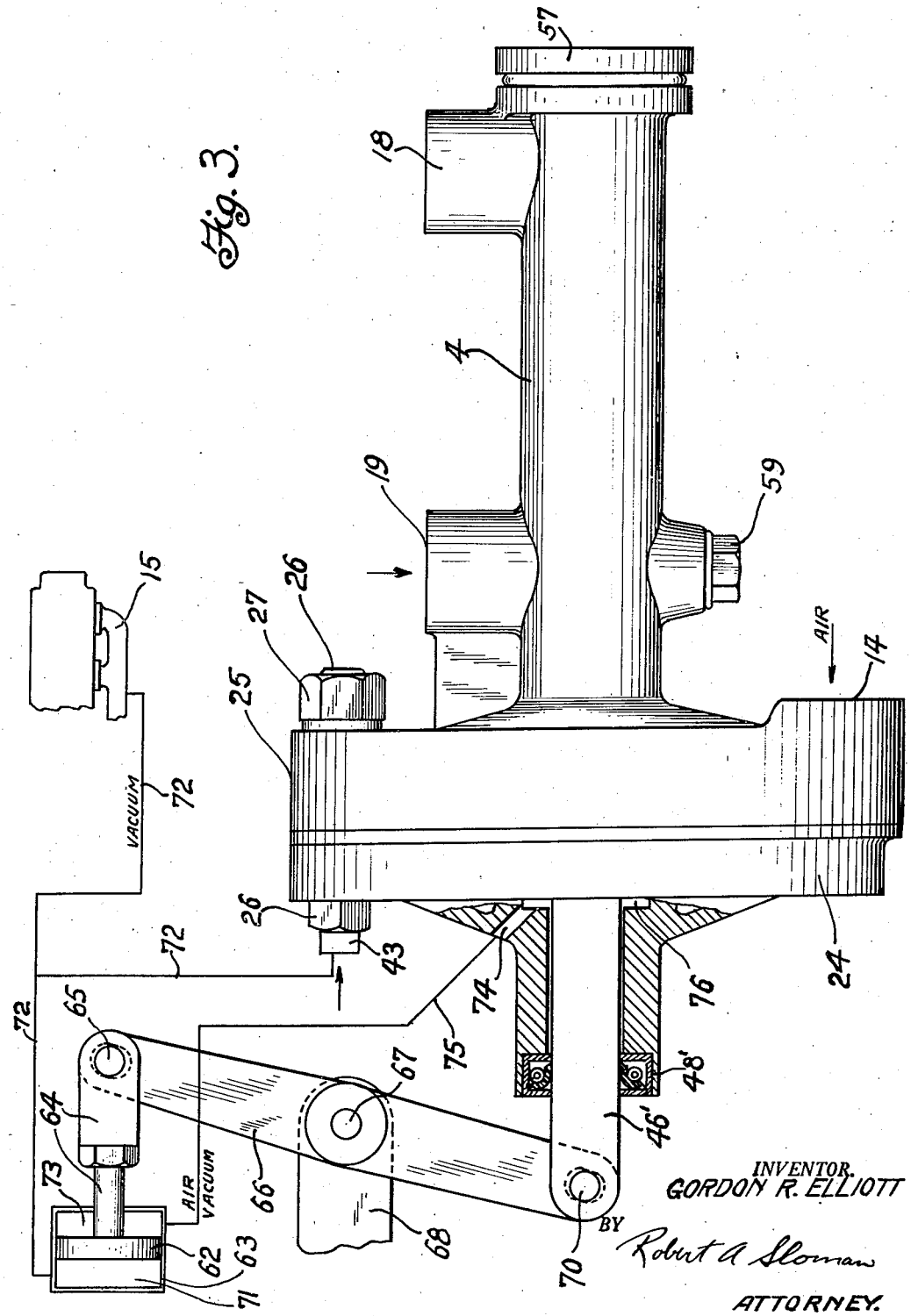

Patented Dec. 14, 1948

2,455,984

UNITED STATES PATENT OFFICE 2,455,984

HYDRAULIC PRESSURE INTENSIFIER UNIT

Gordon R. Elliott, Ferndale, Mich., assignor to Irving A. Puchner and Edward U. Demmer, Milwaukee, Wis.

Application January 22, 1945, Serial No. 573,997

9 Claims. (Cl. 60—54.5)

This invention relates to a hydraulic unit for the actuation of vehicle or truck brakes. More particularly the invention relates to the combination with the hydraulic master cylinder manually operable brakes, of a power unit for effecting a secondary power brake operation, as shown similarly in co-pending application Serial No. 508,033, filed October 28, 1943, now Patent No. 2,440,654.

It is the object of this invention to provide in conjunction with the conventional hydraulic master fluid cylinder governing vehicle braking, a secondary power breaking mechanism including a diaphragm actuating power chamber, a hydraulic cylinder, and a vacuum-air controlling valve.

It is the object of this invention to provide a secondary power brake mechanism characterized by a manifold vacuum suspended power chamber actuated diaphragm, together with means for disconnecting vacuum to one of the sides thereof and admitting air thereto for actuation and translation thereof.

It is the further object herein to provision a brake operating hydraulic cylinder for supplying to the vehicle brakes initially manually operable master cylinder brake fluid under pressure, and secondary power actuated fluid under pressure.

The invention relates to the various arrangement of elements and their combinations as more fully set out in connection with the appended drawings, of which—

Fig. 3 is an elevation view thereof with remote power chamber.

The above drawings are merely illustrations of a preferable embodiment of the present invention, it being understood that other embodiments are contemplated within the scope of this invention as set out in the appended claims.

Figure 1:
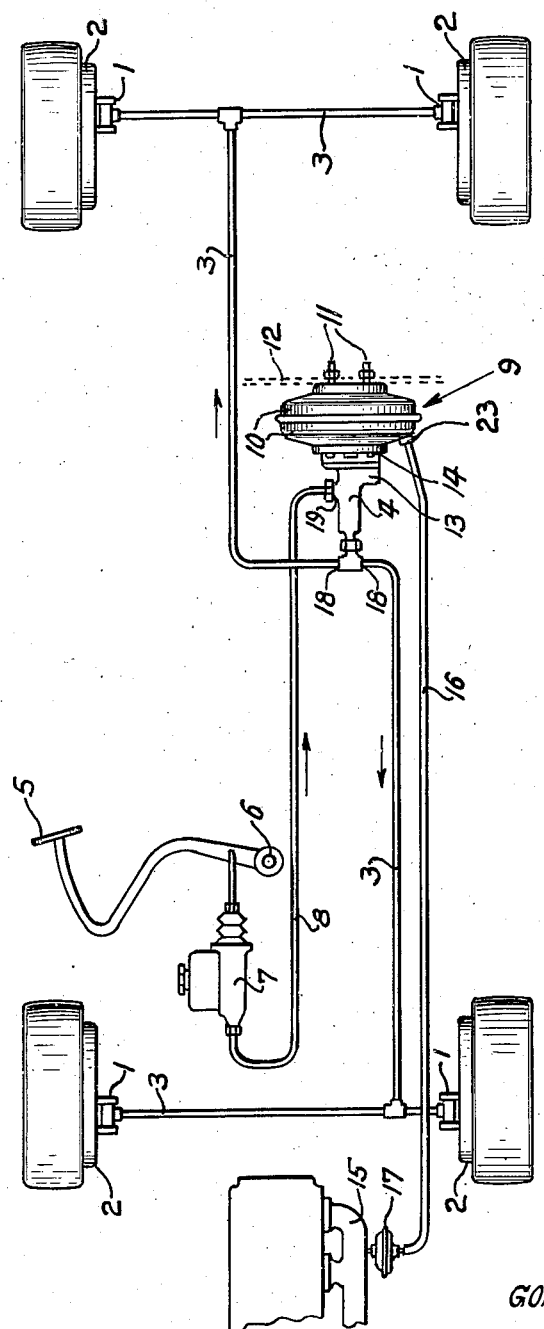
Fig. 1 is a diagrammatic view showing the hydraulic vehicle brake actuating cylinder, the manual master cylinder brake mechanism, and the supplementary power brake unit joined thereto.

In Fig. 1 suitable hydraulic wheel cylinders 1 are provided adjacent the vehicle wheel brakes 2 with hydraulic connections thereto being supplied through conduits 3 from the hydraulic cylinder 4.

Brake foot pedal 5 pivoted at 6 is adapted to actuate the piston within the master hydraulic cylinder 7 for supplying fluid therein under pressure to said hydraulic cylinder 4, through conduit 8 for normal manual brake application.

The hydraulic power unit 9 with power chamber 10 is carried by bolts 11 secured to the vehicle frame 12 or suitable bracket secured thereto. The vacuum hydraulic valve housing 13 with air inlets 14 is joined to vehicle intake vacuum manifold 15 by conduit 16 and manifold check valve 17 for supplying vacuum to power chamber 10 as hereunder explained.

Figure 2:
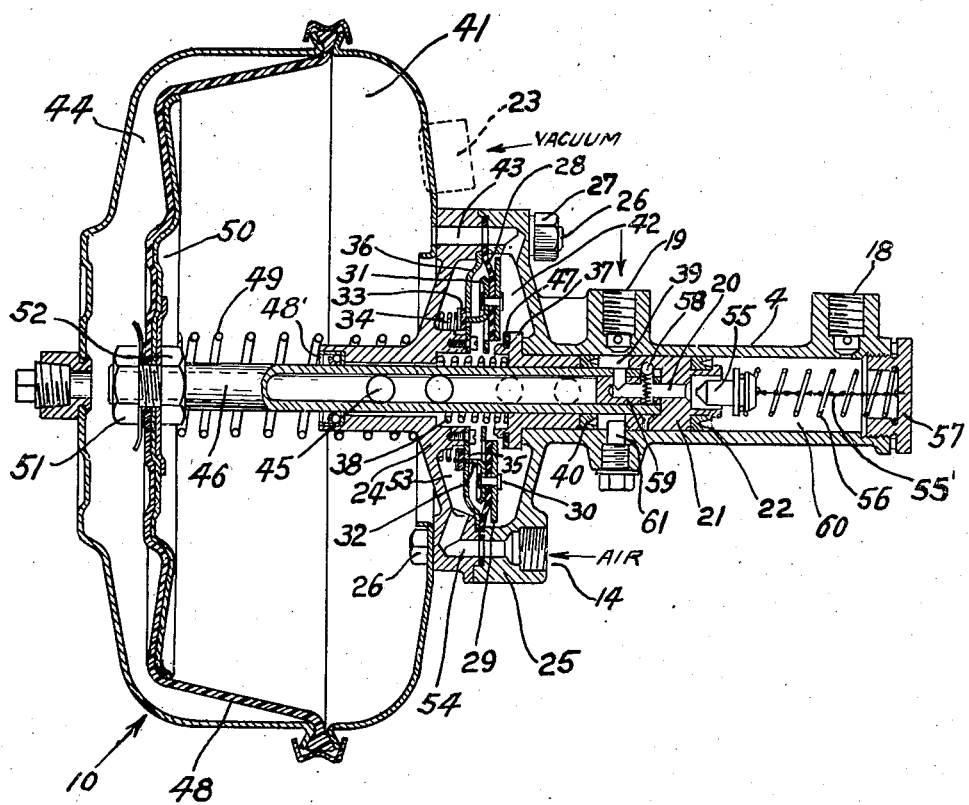
Fig. 2 is an enlarged elevational section of the hydraulic brake cylinder and power brake unit.

Referring to Fig. 2 the vehicle brake hydraulic cylinder 4 has an outlet port 18 for communication with hydraulic brake lines 3 shown in Fig. 1. While one such port is shown in Fig. 2, Fig. 1 shows two such outlet ports 18 for communication with conduits 3.

Intake port 19 connects with conduit 8 from the hydraulic master cylinder 7 whereby manually operated brake fluid is supplied under pressure to hydraulic cylinder 4 to be directed through the longitudinal opening 20 within piston 21 slidingly positioned in cylinder 4. Piston expansion cup 22 carried by piston 21 provide an effective hydraulic seal within cylinder 4.

Power chamber 10 is provided at one side thereof with a vacuum inlet connection 23 adapted for connection to vacuum conduit 16 from the vehicle intake manifold 15 in the manner illustrated in Fig. 1.

The vacuum valve body housing 24 extending within power chamber housing 10 is suitably secured to the annular flange 25 of cylinder housing 4 by bolts 26 and nuts 27. It will be noted that said flanged portion 25 also forms a part of air and vacuum valve body 24. Power chamber 10 is likewise retained in fixed relation to valve body 24 by bolts 26 as shown in Fig. 2.

A hollow air control diaphgram 28 is peripherally retained between the annularly flanged members 24 and 25 which form the control valve body. Hollow diaphragm stiffening plate 29 is secured on one side of said diaphragm by rivets 30, the other ends of said rivets retaining air valve control disc 31 on the other side of said diaphragm.

Disc 31 is punched outwardly to form the annular flanged member 32 which is adapted to unseat air control disc 33, the latter being normally retained by spring 34 over annular air opening 35 in air valve seat 36. It will be noted that annular air valve seat 36 is peripherally secured between valve body flange 24 and diaphragm 28.

Hollow flanged valve control piston 37 is reciprocably and slidably positioned within the end of hydraulic cylinder 4 in engagement with spring 38, the other end of which is seated against the interior of valve body 24. Piston 37 is suitably sealed from control chamber 39 by the rubber expansion cup 40.

As shown in Fig 2, vacuum communication established at connection 23 of the power chamber 10 constantly maintains a vacuum condition in chamber 41 as well as in chamber 42 joined thereto by passage 43 formed within valve body 24—25.

As shown in Fig. 2, vacuum is established in chamber 44 through openings 45 in hollow power rod 46. It will be noted that movement to the left of valve control piston 37 causes disc 47 thereon to sealingly engage plate 29 cutting off further vacuum communication to chamber 44.

Initially, the vacuum in chambers 41 and 44 power diaphragm 48 peripherally secured within power chamber 10, assumes the position shown, with return spring 49 being interposed between valve body 24 and diaphragm supporting plate 50. It will be noted that a suitable seal 48' is provided around rod 46 and within the end of valve housing 24.

Said diaphragm and plate are centrally secured to hollow power rod 46 by the opposing nuts 51 and 52 threaded on said rod.

Referring to the control valve body 24 it is seen that air is at all times maintained in chamber 53 through air passage 54 formed within valve body members 24 and 25.

As valve control piston moves to the left relatively to rod 46, in the manner hereafter described, it first engages diaphragm disc 29 for cutting off further vacuum communication between chamber 42 and chamber 44. Further movement to the left of piston 37 causes translation to the left of diaphragm 28 as well as the flanged member 32 for unseating spring retained disc 33 from its seat 36.

Air in chamber 53 is now able to flow through opening 35 in seat 36, through openings 45 in hollow rod 46 for communication with chamber 44 in power chamber housing 10. Air in chamber 44 and vacuum in chamber 41 disturbs the pre-existing equilibrium creating a substantial pressure differential on opposite sides of diaphragm 48, with the result that said diaphragm is projected forcefully to the right at the same time forcefully projecting power rod 46 centrally joined thereto. Movement to the right of rod 46 effects corresponding movement of hydraulic piston 21 in hydraulic cylinder 4 until opening 20 in piston 21 is closed by engagement of valve member 55 resiliently supported by coil spring 56, the outer end of which is adjustably secured by removable cover 57 threaded in the end of hydraulic cylinder 4.

It will be noted that rod 46 is secured at all times to piston 21 by means of the spring retained ball lock 58 so that piston 21 always moves with rod 46. Ball lock 58 may be manually disengaged from piston 21 in the event it is desired to separate said piston and rod for disc assembly and, or cleaning. A plug 59 is tightly secured within hollow rod 46 with a suitable passage formed therein to coincide with and form a part of passage 20 in piston 21. Ball chain 55' interconnects valve 55 and cover 57 to limit movement of said valve.

Referring to Figs. 1 and 2, for conventional operation of the brakes the master cylinder 7 is operated by foot pedal 5 for directing fluid under pressure through conduit 8, into port 19 of the hydraulic cylinder, chamber 39 and through passage 20 into chamber 60 whence it is directed out connection 18 through conduits 3 to the brake cylinders 1 for the vehicle wheels respectively. This initial actuation of break pedal 5 will result in a partial braking effect upon wheel drums 2 and will also take up the slack of fluid in chamber 60 as well as in conduits 3.

As soon, however, as said slack is taken up it will be seen that continued and further actuation of brake pedal 5 will tend to compress fluid within chamber 39 as well as in chamber 60 with the result that valve control piston 37 is projected to the left. In the first instance, it will be seen that disc 47 carried by said piston will engage the diaphragm disc 29 for closing off further vacuum communication to chamber 44 forming a part of power chamber 10. It will be noted that momentarily there is a balanced condition between chambers 41 and 44 with vacuum in both chambers. However, further movement of control piston 37 to the left effects movement to the left of diaphragm 28 as well as the flanged member 32 which unseats spring retained air control disc 33.

Air which is constantly in chamber 53 is thus free to rush through opening 35 in valve seat 36 for communication with chamber 44 through hollow rod 46. Instantly there is a forceful translation of diaphragm 48 to the right due to the pressure differential between chambers 41 and 44 which is proportionate to the surface area of said diaphragm, and which results in forceful translation of power rod 46. Hydraulic piston 21 being joined thereto is also translated forcefully to the right, first sealing off passage 20 by engagement of valve member 55. Further movement of hydraulic piston 21 tends to exert a compressive force upon the fluid in chamber 60 with the result that a secondary power braking is effected through lines 3. It will be understood that as soon as passage 20 is closed off by engagement with valve member 55, fluid under pressure, which is maintained by continued application of brake pedal 5, is directed to chamber 39; and inasmuch as passage 20 is now closed, it will be seen that a degree of fluid pressure exists for cooperative action upon the end of piston 21 working in unison with the power rod 46 which is also effecting a pressure movement on piston 21 relative to the hydraulic fluid in chamber 60.

For example, while the initial braking pressure may be approximately 200 pounds per square inch, power chamber 10 effects a substantial multiplication of braking pressure so that approximately 800 to 1000 pounds per square inch pressure is available. It is understood that the above pressures are given merely by way of illustration and naturally would be varied depending upon the size of power chamber 10 and the surface area of diaphragm 48. Movement of piston 21 to the right increasing the volume of chamber 39 partially reduces the existing fluid pressure therein permitting a partial return of valve piston 37 to the right under action of coiled spring 38. Diaphragm 28 and plate 29, under action of spring 34, follow valve piston 37 to the right, permitting air disc 33 to seat itself under action of said spring 34, cutting off further air communication between chambers 53 and 44. Said valve assembly is now in a balanced condition with further air and vacuum communication to chamber 44 effectively cut off.

Brake release is effected by relieving the manual pressure from master cylinder 7 with the result that the pressure in chamber 39 is reduced permitting control piston 37 to return to its initial position under action of coil spring 38. As soon as control piston 37 reaches the position shown in Fig. 2, vacuum communication is again established between chamber 41 and chamber 44, with the result that an equilibrium in pressure is established on opposite sides of diaphragm 48. Said diaphragm then returns to its initial position shown in Fig. 2, under action of coil spring 49. It will be noted that return of diaphragm 48 to its initial position also effects a corresponding return of power rod 46 as well as hydraulic piston 21 secured thereto.

A stop member 61 is threaded through hydraulic cylinder 4 and projects into chamber 39 to provide a limitation on the return movement of piston 21 as well as power rod 46 and diaphragm 48 secured thereto. The return of piston 21 to its initial position results in the unseating of valve member 55 again opening passage 20 in said piston which communicates with chamber 39. Thus all operating members are again in their initial positions ready for the next actuation of the brakes.

It will be understood that in the event of a failure of the power braking system or the air and vacuum control valve therein, manual application of the brakes is still available as above described.

After application of the power brakes, and on release of foot pedal 5, the fluid pressure in control chamber 39 is reduced approaching zero, permitting valve control piston 37 to gradually return to the right, relatively to power rod 46, until it reaches its initial position shown in Fig. 2. At the same time, with high pressure in chamber 60 and opening 20 still closed, piston 21 starts moving back to the initial position shown in Fig. 2 due to the differential of pressure on opposite sides thereof.

The return movement of piston 21 is limited by the return movement of power rod 46 and diaphragm 48 to which it is joined. As a short period of time elapses before full vacuum is again established in chamber 44 diaphragm 48 tends to lag in returning to its inoperative position, as shown in Fig. 2, even though under expansive action of spring 49. This lag would be transmitted to piston 21 delaying its return for effecting complete brake release.

However, it is seen by the initial pressure differential between chambers 39 and 60 that, on release of pedal 5, piston 21 is assisted in its return. Furthermore, ball chain 55' limits the return movement of valve 55 guaranteeing the quick opening of passage 20 of piston 21. Opening of passage 20 immediately effects complete brake release with fluid under pressure in chamber 60 free to escape. Thus brake release is prompt which is a great advantage over power brakes of different construction wherein means are not provided for assisting in the brake release function.

Power chamber 10 is advantageously secured or formed integrally with control valve 24—25 to provide a compact unit which may be positioned anywhere on the vehicle or truck frame. However, it is contemplated that said power chamber could be remote from the control valve with a suitable linkage interconnecting the diaphragm and the valve actuating power rod 46.

On the other hand it is also contemplated that valve actuating rod 46 could be forcefully actuated by any other suitable power source acting through a suitable linkage.

It will be understood that while the power chamber 10 is shown in Fig. 2 with a flexible movable diaphragm therein, it is contemplated that said power chamber could be constructed with a reciprocable piston therein. Creation of pressure differentials on opposite sides of the piston would be effected exactly as described with respect to Fig. 2.

Fig. 3 shows the combination of hydraulic brake cylinder 4 with fluid delivery outlet 18, and air and vacuum control valve 24—25. However, the power source is remote from the hydraulic cylinder and may be of any suitable construction, as for instance, a reciprocable piston within a cylinder as above mentioned.

Corresponding manual fluid control inlet port 19 is shown for connection to master cylinder 7 through conduit 8 as illustrated in Fig. 1. The air and vacuum control valve 24—25, as well as hydraulic cylinder 4, are the same in construction as shown in Fig. 2, with power shaft 46' reciprocably positioned therethrough effecting movements of the fluid control piston 21.

Connecting rod 64 projects from piston 62 reciprocably provisioned within power chamber cylinder 63. Rod 64 is pivotally joined at its end 65 to lever 66 centrally pivoted at 67 to bracket 68 or other member forming a part of the vehicle frame.

Power shaft 46' is pivotally and loosely joined at 70 to the other end of lever 66.

Vacuum chamber 71 in cylinder 63 is joined to the vehicle engine intake manifold 15 by conduit 72 as shown diagrammatically in Fig. 3. Conduit 72 also provides vacuum communication to the valve vacuum passage 43 shown in detail in Fig. 2. Operating chamber 73 on the other side of piston 62 is supplied air or vacuum from the control valve outlet 74 through conduit 75.

It is understood that valve outlet 74 communicates with the interior chamber 76 of valve 24—25, and is provided air from intake port 14 and, or vacuum from port 43 depending upon the positioning of the movable valve member within said valve housing heretofore described in detail.

Having described my invention, reference should be had to the claims which follows for determining the scope thereof.

I claim:

1. The combination, a hydraulic cylinder, a valve control piston and a fluid control piston with an opening therethrough oppositely disposed therein providing a fluid chamber therebetween, there being a secondary fluid chamber in said cylinder for delivering fluid under pressure, a manually controlled pressure fluid source joining said first chamber, adapted for communication with said secondary chamber through said fluid control piston, and for operative pressure engagement with said valve control piston for effecting movement thereof, a power chamber, a movable member therein, means on said member slidably extending through said valve control piston and joined at its outer end to said fluid control piston and adapted to forceful translation upon a pressure differential on opposite sides of said movable chamber, an air and vacuum control valve intermediate said cylinder and power chamber engageable by said valve control piston for effecting said differential, valve means in said secondary fluid chamber for closing the opening in said fluid control piston on movement thereof in one direction, and flexible limiting means joined to said valve means for unseating the same relative to said piston opening on movement thereof in the opposite direction.

2. The combination, a hydraulic cylinder, an air and vacuum valve control piston and a brake fluid control piston with an opening therethrough in said cylinder, a manually controlled pressure fluid source intermediate said pistons adapted for communication through said fluid control piston and for operative pressure engagement with said valve control piston, a power chamber, a movable member therein, means on said member slidably extending through said valve control piston and joined at its outer end to said fluid control piston and adapted to forceful translation upon a pressure differential on opposite sides of said movable member, an air and vacuum control valve intermediate said cylinder and power chamber engageable by said valve control piston for effecting said differential, resiliently urged valve means in said cylinder for closing communication through said fluid control piston on movement thereof in one direction, and flexible limiting means joined to said valve means for unseating the same relative to said piston opening on movement thereof in the opposite direction.

3. The combination, a hydraulic cylinder, air and vacuum valve control and brake fluid control pistons therein, the latter piston having an opening therethrough, a manually controlled pressure fluid source intermediate said pistons adapted for communication through said fluid control piston and for operative pressure engagement with said valve control piston, a power chamber, a movable member therein, means on said member slidably extending through said valve control piston and joined at its outer end to said fluid control piston and adapted for forceful translation upon a pressure differential on opposite sides of said movable member, a vacuum source joining said power chamber on one side of said movable member, an air and vacuum control valve intermediate said cylinder and power chamber for normally maintaining vacuum communication to the other side of said movable member, but adapted on movement of said valve control piston engaging said valve for cutting off said latter vacuum communication and establishing air communication thereto, resiliently urged valve means in said cylinder for closing communication through said fluid control piston on movement thereof in one direction, and flexible limiting means joined to said valve means for unseating the same relative to said piston opening on movement thereof in the opposite direction.

4. The combination, a hydraulic cylinder, a power chamber containing a movable diaphragm centrally therein defining a vacuum chamber and an operating chamber on opposite sides thereof, an air and vacuum control valve intermediate and co-axial with said cylinder and power chamber adapted to alternately provide air and vacuum communication to said operating chamber, a vacuum source communicating with said vacuum chamber, a valve operating piston adapted to engage said valve and a brake fluid control piston having an opening therethrough in said cylinder, a manually controlled pressure fluid source intermediate said pistons adapted for communication through said fluid control piston and for pressure engagement with said valve operating piston, a plunger rod slidably provisioned through said valve and valve operating piston joined at one end to said diaphragm and at its other end to said fluid control piston, resiliently urged means in said cylinder for closing communication through said fluid control piston on movement thereof in one direction, and flexible limiting means joined to said valve means for unseating the same relative to said piston opening on movement thereof in the opposite direction.

5. The combination, a hydraulic cylinder, a power chamber containing a movable diaphragm therein defining a vacuum chamber and an operating chamber on opposite sides thereof, an air and vacuum control valve housing intermediate and co-axial with said cylinder and power chamber, a movable valve member therein, a diaphragm peripherally secured within said housing and supporting said valve member, the latter being adapted to alternately provide vacuum and air communication through said housing to said operating chamber, a vacuum source communicating with said vacuum chamber, a valve operating piston adapted to operatively engage said movable valve member, and a fluid control piston having an opening therethrough both in said cylinder, a manually controlled pressure fluid source intermediate said pistons adapted for communication through said fluid control piston and for pressure engagement with said valve operating piston, a plunger rod slidably provisioned through said housing, movable valve member, and valve piston, joined at one end to said first diaphragm and at its other end to said fluid control piston, resiliently urged valve means in said cylinder for closing communication through said fluid control piston on movement thereof in one direction, and flexible limiting means joined to said valve means for unseating the same relative to said piston opening on movement thereof in the opposite direction.

6. The combination, a hydraulic cylinder, a fluid control piston having an opening therethrough and a valve control piston in said cylinder in spaced relation, a manually operable pressure fluid source between said pistons adapted for communication through said piston opening, and for operative pressure engagement with the other piston, a power chamber, a movable member therein adapted to translation upon a pressure differential on opposite sides thereof, a longitudinally movable plunger rod joining said movable member at one end and said fluid control piston at its other end and slidably disposed through said valve control piston, an air and vacuum control valve co-axial with and intermediate said cylinder and power chamber engageable by said valve control piston for effecting said differential, resilient valve means in said cylinder for closing the opening in said fluid control piston on movement thereof in one direction, flexible limiting means joined to said valve means for unseating the same relative to said piston opening on movement thereof in the opposite direction, resiliently urged means intermediate said valve control piston and the end of said cylinder.

7. The combination, a hydraulic cylinder, valve control and fluid control pistons oppositely disposed therein providing a fluid chamber therebetween, said fluid control piston having an opening therethrough there being a secondary fluid chamber in said cylinder for delivering fluid under pressure, a manually controlled pressure fluid source joining said first chamber, adapted for communication with said secondary chamber through said fluid control piston, and for operative pressure engagement with said valve control piston for effecting movement thereof, a power chamber, a movable member therein, means on said member slidably extending through said valve control piston and joined to said fluid control piston and adapted to forceful translation upon a pressure differential on opposite sides of said movable member, an air and vacuum control valve intermediate said cylinder and movable member engageable by said valve control piston for effecting said differential, resiliently urged valve means in said secondary chamber for closing communication through said fluid control piston on movement thereof in one direction, and flexible limiting means joined to said valve means for unseating the same relative to said piston opening on movement thereof in the opposite direction.

8. The combination, a power chamber having a movable member therein defining an operating chamber and a vacuum chamber, a hydraulic cylinder containing a brake fluid control piston and a valve control piston, a manually controlled pressure fluid source intermediate said pistons adapted for communication through said fluid control piston and for operative pressure engagement with said valve control piston, a valve housing having air and vacuum inlet ports, and an outlet port communicating with said operating chamber, a hollow reciprocable valve member in said housing, a diaphragm peripherally secured to said housing and centrally carrying said movable member providing a normally closed air passage between said air port and said outlet port, said valve control piston being normally spaced from said valve member providing a normally open vacuum passage between said vacuum port and said outlet port, whereby progressive movement in one direction of said valve control piston closes said vacuum passage and further movement thereof causes movement of said valve member to open said air passage, and partial movement of said valve piston in the opposite direction permits closing of said air passage, and further movement in the same direction opens said vacuum passage, whereby vacuum and air communication are alternately provided to said operating chamber, a vacuum source communicating with said vacuum chamber and with said vacuum inlet port, and a plunger rod secured to said power chamber movable member at one end and to said fluid control piston at its other end, slidably provisioned through said valve housing, said valve member, and through said valve operating piston.

9. A power unit comprising a hydraulic cylinder containing fluid to be supplied under varying pressures to the wheel brake cylinders of a vehicle, a piston with an opening therewith in said cylinder operable on said fluid, a manually operable pressure fluid source communicating with said fluid, a power chamber, a movable member therein, means on said movable member joined at its outer end to said piston and adapted to translation upon a pressure differential on opposite sides of said movable member, an air and vacuum control valve co-axial with and intermediate said cylinder and power chamber for effecting said differential, a secondary piston in said hydraulic cylinder in spaced relation to said first piston engageable with said valve and operable upon by said manually operable pressure fluid source for controlling said valve, valve means in said cylinder for closing the opening in said first piston on movement thereof in one direction, and flexible limiting means joined to said valve means for unseating the same relative to said piston opening on movement thereof in the opposite direction.

GORDON R. ELLIOTT.

REFERENCES CITED

The following references are of record in the file of this patent:

UNITED STATES PATENTS

| Number | Name | Date |
|---|---|---|
| 2,246,141 | Main | June 17, 1941 |
| 2,260,490 | Stelzer | Oct. 28, 1941 |
| 2,280,784 | Berno | Apr. 28, 1942 |
| 2,308,460 | Stelzer | Jan. 12, 1943 |
| 2,308,956 | Hatch | Jan. 19, 1943 |
| 2,347,239 | Berno | Apr. 25, 1944 |
| 2,352,357 | Almond | June 27, 1944 |
| 2,361,419 | Schnell | Oct. 31, 1944 |
| 2,365,471 | Ingres | Dec. 19, 1944 |
| 2,372,014 | Rockwell | Mar. 20, 1945 |